United States Patent

[11] 3,544,701

[72] Inventors Abram Simkhovich Zelichenko,
 4, korpus II, kv. Staro-Kashirskoe shosse,
 51; Evgeny Arkadievich Khvoles, ulitsa
 Krapotkina, 34, kv. 22; **Elizaveta
 Alexandrovna Sokolova,** ulitsa Dmitrovka,
 38, kv. 21, Moscow, U.S.S.R.
[21] Appl. No. 836,856
[22] Filed June 26, 1969
[45] Patented Dec. 1, 1970

[54] SYSTEM FOR TRANSPOSING THE WIRES OF A POWER TRANSMISSION LINE, MAINLY OF A HIGH VOLTAGE POWER TRANSMISSION LINE
4 Claims, 1 Drawing Fig.
[52] U.S. Cl. .................................................. 174/33,
 174/43
[51] Int. Cl. ................................................ H02g 7/20
[50] Field of Search .......................................... 174/33, 40,
 43, 45, 147

[56] References Cited
UNITED STATES PATENTS
1,203,540 10/1916 Harrington .................. 174/33

FOREIGN PATENTS
639,560 3/1928 France .......................... 174/33
1,091,319 10/1954 France .......................... 174/40

OTHER REFERENCES
E. T. Painton, Mechanical Deisgn of Overhead Electrical Transmission Lines, D. Van Nostrand Co., New York, 1925, pages 223—230.

Primary Examiner—Laramie E. Askin
Attorney—Waters, Roditi, Schwartz & Nissen

ABSTRACT: A system is provided for transposing the phases of a high voltage electrical transmission line having a horizontal arrangement of three wires mounted on respective vertical poles. For this purpose, two additional vertical poles with a phase line suspended therebetween are provided and loop connectors effect phase connection between the line and wires directly and without the employment of additional insulator strings or brackets on the poles for suspending the lines. This considerably simplifies the pole design and reduces the number of insulators. The outer vertical phase poles and the two additional verticals poles are displaced along and across the transmission line with respect to the middle vertical pole a distance sufficient for proper electrical spacing to be observed between the wires of opposite phases, the loop connectors and the poles, and the loop connectors and the ground.

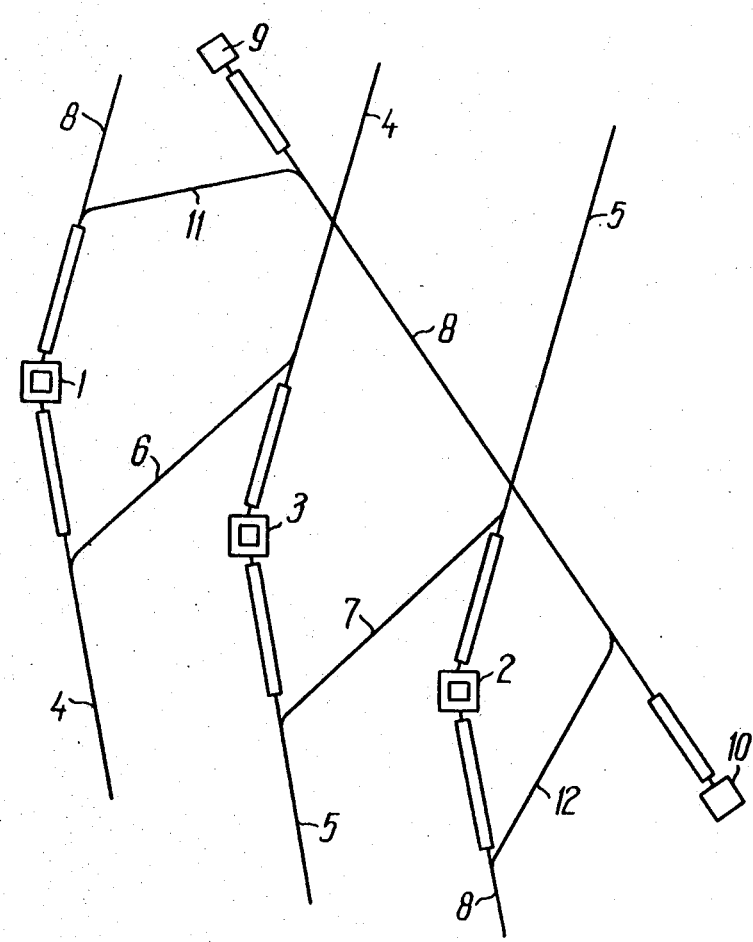

3,544,701

SYSTEM FOR TRANSPOSING THE WIRES OF A POWER TRANSMISSION LINE, MAINLY OF A HIGH VOLTAGE POWER TRANSMISSION LINE

The present invention relates to a system for transposing wires of power transmission lines, mainly those rated for ultrahigh voltages such as in mounting a.c. power transmission lines.

Widely known in the art is a system for transposing wires of a high-voltage power transmission line on a three strut pole with two additional struts, in which the transposition of the wires of the first and middle phases is accomplished by means of supporting insulator chains or strings fixed on brackets of the first and middle struts, and the third phase is transposed by means of one supporting and two tie-down strings of insulators arranged on the bracket of the third strut and on two additional struts disposed parallel to the bisectrix of the internal angle of the route turn.

In the above-mentioned device, the three struts of the main support are arranged along the bisectrix of the internal angle of turn of the route of the power transmission line and are equally spaced from each other.

Such a device is complicated and uneconomical due to the necessity of using additional brackets on the pole struts, which make the latter heavier, and due to the use of a great number of insulator chains or strings.

It is an object of the present invention to eliminate the above-mentioned disadvantages.

The main object of the present invention is to provide a system for transposing the wires of a high-voltage power transmission line which features lighter construction of the poles and a smaller number of insulator chains.

This object is accomplished by arrangement in which, in the system for transposing the wires of a power transmission line, mainly a high-voltage power transmission line, on a three strut pole with two additional struts, according to the invention, the extreme struts of the three strut pole and the additional struts are displaced along and across the route of the power transmission line relative to the middle strut by a distance determined by the electrical gage between the struts of the pole and the connecting loops, the insulator strings or chains of the respective phases being directly connected by the loop.

The system proposed herein for the transposition of the wires of a power transmission line in accordance with the present invention is instrumental in achieving the objects set forth above.

For a better understanding of the present invention a detailed description of an exemplary embodiment thereof is given hereinbelow with reference to the sole figure of the accompanying drawing which shows a plan view of the apparatus for transposing the wires of a power transmission line.

As can be seen from the drawing, for transposing the wires of a power transmission line at the turns of the line route, extreme struts 1 and 2 of a three leg pole are displaced along and across the power transmission line route relative to middle strut 3 by a distance such that phases 4 and 5 can be connected directly, without recourse to supporting insulator chains, by loops 6 and 7.

The distance by which the struts 1 and 2 are displaced relative to the strut 3 is determined by the electrical gage possible between the pole struts and the connecting loops.

The third phase 8 is transposed by means of additional struts 9 and 10 and loops 11 and 12, said loops being passed from the wires between the struts 9 and 10 onto the wires of the third phase also directly, without supporting insulator chains.

The distance between the additional struts 9 and 10 relative to the middle strut 3 of the pole is also determined by the electrical gages required to be observed between the line wires and the pole struts.

We claim:

1. In a system for transposing the phases of a high voltage electrical transmission line having a horizontal arrangement of three wires mounted on respective vertical poles constituting a middle and two outer poles, an improvement comprising two additional vertical poles and a phase line between said additional poles, and means including loop connecters effecting phase connection between the line and wires directly and without the employment of additional insulator strings or brackets on the poles for suspending the lines, the outer vertical poles and the two additional vertical poles being displaced along and across the transmission line with respect to the middle vertical pole a distance sufficient for the electrical spacing to be observed between the wires of opposite phases, the loop connecters and the poles, and the loop connecters and the ground.

2. In a system as claimed in claim 1 wherein said outer poles are displaced along the line in opposite directions relative to the middle pole, one of said additional poles being between the middle and one of the outer poles, the other additional pole lying on a side of the other outer pole opposite the middle phase line.

3. In a system as claimed in claim 2 wherein said phase line between the additional poles is inclined at an angle relative to said wires.

4. In a system as claimed in claim 3 wherein two of said loop connecters extend from said phase line between the additional poles respectively to the outer wires and two further loop connecters respectively extend from the middle wire to the two outer wires.